United States Patent
Sova et al.

[11] Patent Number: 6,005,301
[45] Date of Patent: Dec. 21, 1999

[54] APPARATUS FOR PREVENTING UNAUTHORIZED USE OF A MOTOR VEHICLE

[75] Inventors: Edward J. Sova, Troy; Eric B. VanGorp, Allen Park; Joseph C. Toth, Oakland Twp., all of Mich.; Jacob P. Gerring, Beverly Hills, Fla.; Stephen R. Emsley, Northville, Mich.

[73] Assignee: Chrysler Corporation, Auburn Hills, Mich.

[21] Appl. No.: 09/144,911

[22] Filed: Sep. 1, 1998

[51] Int. Cl.[6] .................................................. B60R 25/00
[52] U.S. Cl. .......................... 307/10.2; 180/287; 439/135
[58] Field of Search ................................... 307/9.1, 10.1, 307/10.2–10.6; 180/287; 439/135–140, 521

[56] References Cited

U.S. PATENT DOCUMENTS

| | | | |
|---|---|---|---|
| 4,743,211 | 5/1988 | Hirata et al. | 439/521 |
| 5,173,615 | 12/1992 | Grooms et al. | 307/10.2 |
| 5,254,842 | 10/1993 | Posner et al. | 235/382 |
| 5,449,957 | 9/1995 | Carlo | 180/287 |
| 5,548,164 | 8/1996 | Hillard et al. | 180/287 |
| 5,664,955 | 9/1997 | Arnett | 439/135 |
| 5,804,770 | 9/1998 | Tanaka | 439/521 |

*Primary Examiner*—Richard T. Elms
*Attorney, Agent, or Firm*—William J. Coughlin

[57] ABSTRACT

An apparatus for preventing unauthorized use of motor vehicle includes a shield attachable to an engine control module. The shield is attached to an underside of the engine control module and includes a top plate which extends immediately above a plurality of electrical connectors and prevents unauthorized withdrawal of the electrical connectors. The apparatus further includes a retaining bracket which cooperates with the shield to define a plurality of channels for receiving wire harnesses associated with the electrical connectors.

20 Claims, 3 Drawing Sheets

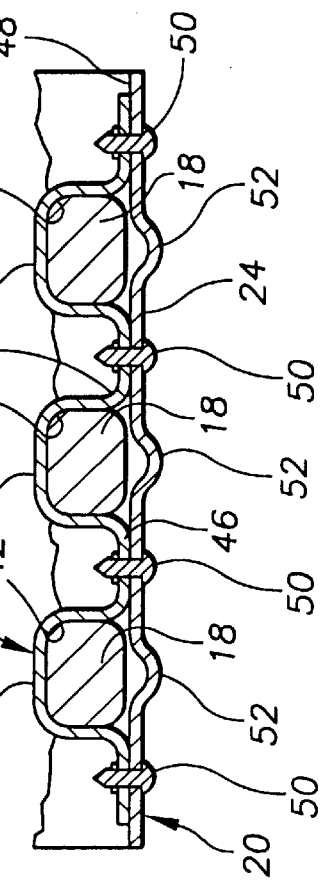
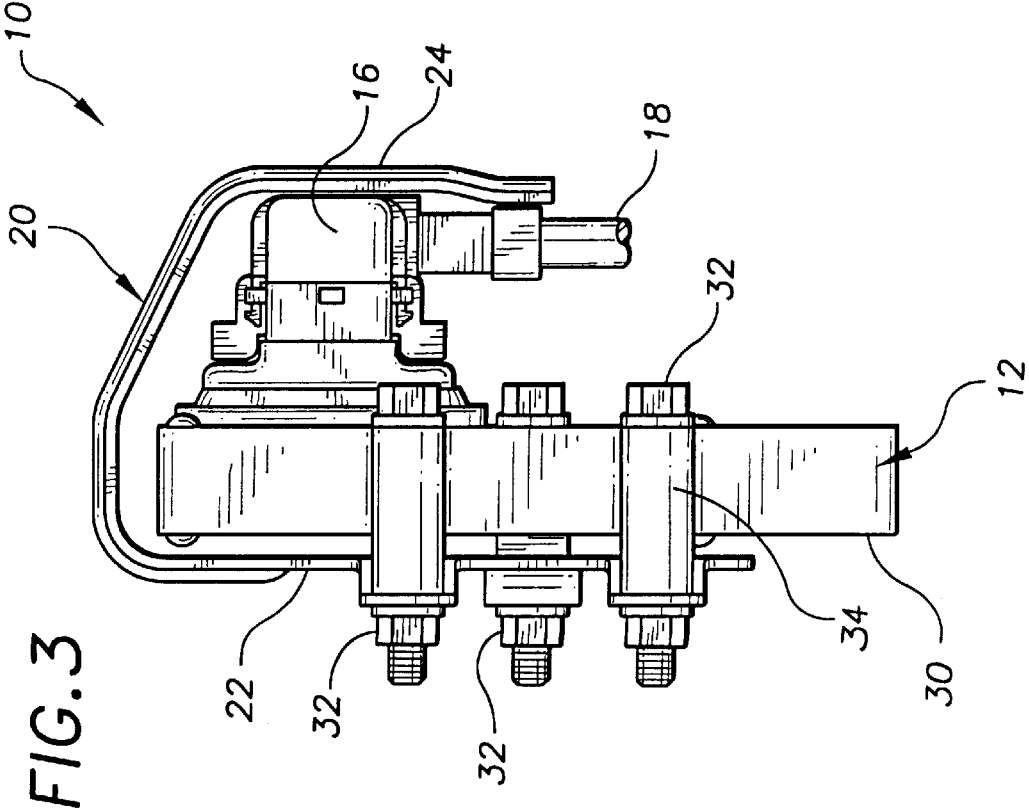

APPARATUS FOR PREVENTING UNAUTHORIZED USE OF A MOTOR VEHICLE

BACKGROUND OF THE INVENTION

1. Technical Field

The present invention generally pertains to motor vehicles. More particular, the present invention pertains to an apparatus for preventing unauthorized use of a motor vehicle. More specifically, but without restriction to the particular embodiment and/or use which is shown and described for purposes of illustration, the present invention relates to a shield for an engine control module which deters vehicle theft by entrapping harness connectors upon engine control module assembly.

2. Discussion

Most conventional motor vehicles are constructed so as to have many of the engine functions under the control of a microprocessor or engine control module. These engine functions include, for example, ignition. Operation of the vehicle with the engine control module requires an appropriately designated key.

It is well known that a large number of motor vehicle are stolen each year or are taken by unauthorized persons for "joyriding". Sophisticate thieves are frequently able to obtain unauthorized operation of a motor vehicle under the control of a separate engine control module. Many devices have been proposed for preventing such authorized use of a motor vehicle. For example, U.S. Pat. No. 5,254,842 discloses a system for preventing unauthorized operation of a vehicle incorporating a wire scrambler and interface module which are interconnected between an engine control module and a memory device. A key device has a signal source and is received within a lock cylinder for energizing a cross bar switch matrix in the interface module. The interface module provides a correct wiring relationship between the engine control module and the memory device. Connector parts are secured together in a manner intended to destroy connector contacts if separated.

Many devices have been proposed for preventing unauthorized use of a motor vehicle including the device disclosed by U.S. Pat. No. 5,254,842. However, all known devices have been found to not be fully satisfactory in that they are relatively expensive, complication to use, not sufficiently reliable, or they are readily circumvented by sophisticated thieves.

SUMMARY OF THE INVENTION

It is a general object of the present invention to provide an improved apparatus for preventing tampering with an engine control module of a motor vehicle.

It is another object of the present invention to provide a shield for preventing unauthorized removal of an engine control module.

In one form, the present invention provides an apparatus for use with an engine control module of a motor vehicle. The engine control module includes a plurality of leads. The apparatus includes a baseplate, a side wall and a top plate which form a generally C-shaped member. The apparatus further includes a retaining bracket attached to a bottom surface of the top plate. The retaining bracket and the top plate cooperate to define a plurality of channels for receiving the plurality of leads.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 3 is an end view of the apparatus of FIG. 1.

FIG. 4 is a cross-sectional view along the line 4—4 of FIG. 1.

DETAILED DESCRIPTION OF THE PREFERRED EMBODIMENT

Figure 1:
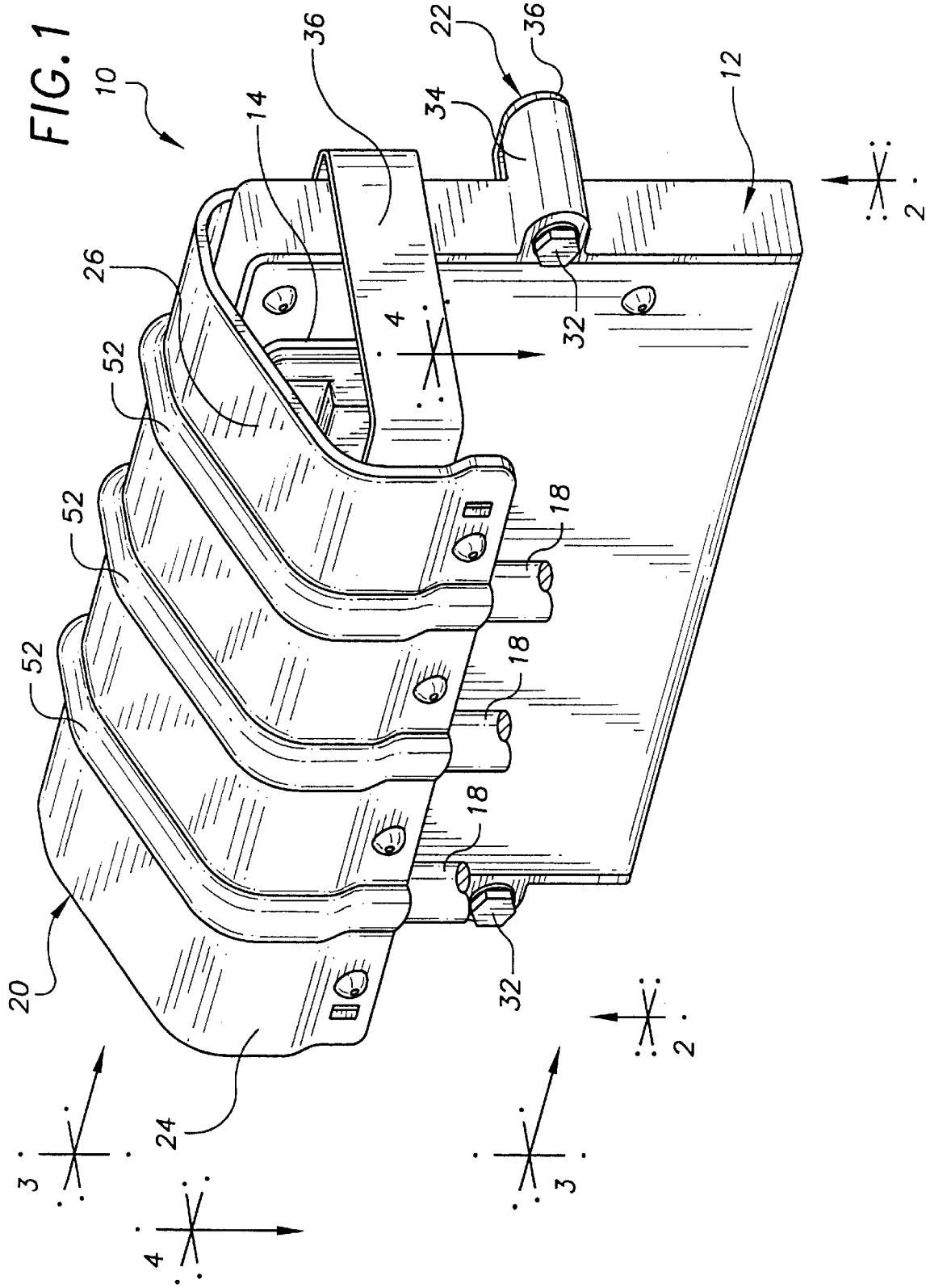
FIG. 1 is a perspective view of an apparatus constructed in accordance with the teachings of the preferred embodiment of the present invention and shown operatively attached to an engine control module of a motor vehicle.
Figure 2:
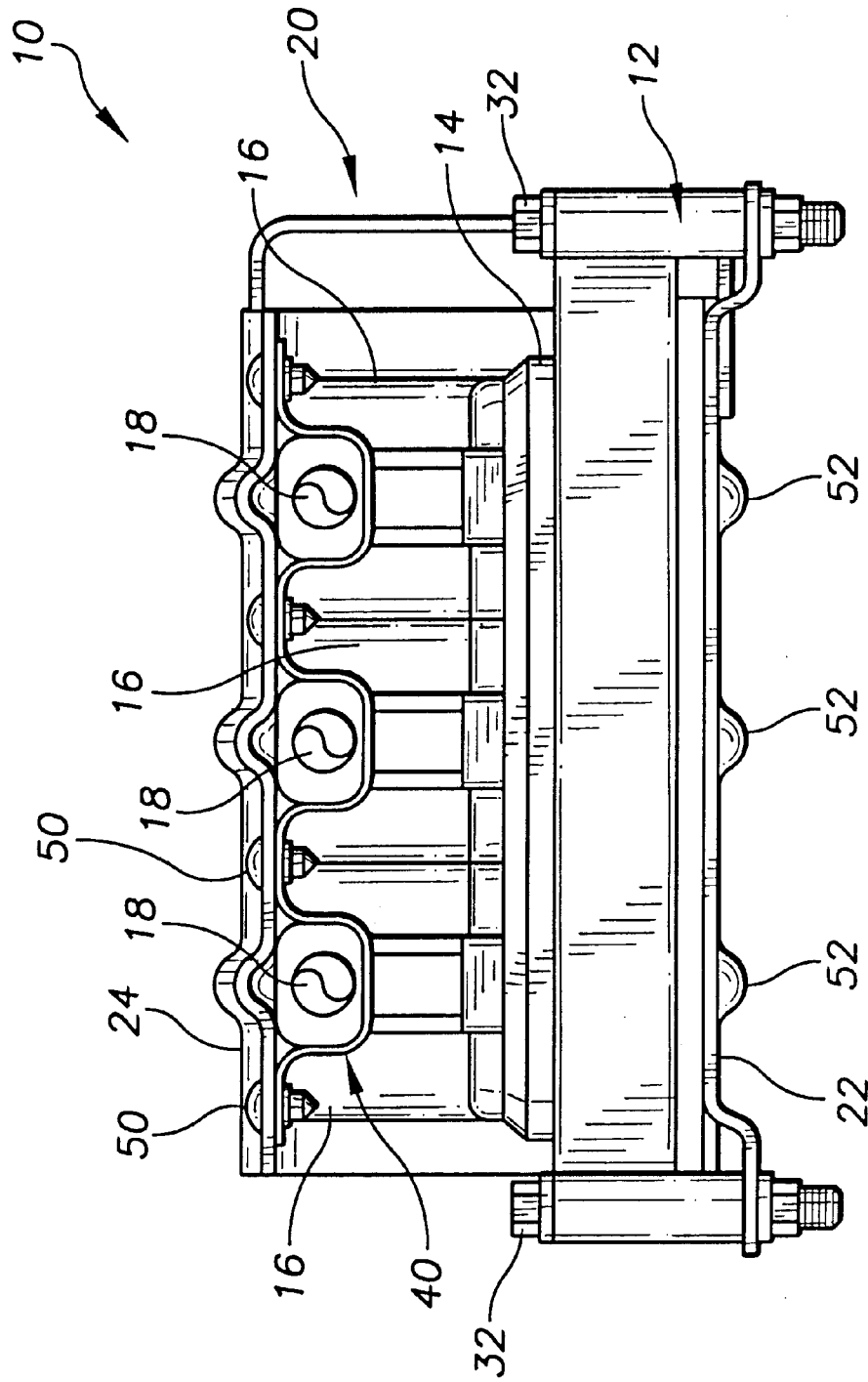
FIG. 2 is a side view of the apparatus of FIG. 1.

With reference to FIGS. 1–4 an apparatus for preventing unauthorized use of a motor vehicle is generally identified with reference numeral 10. The apparatus 10 is shown operatively associated with an engine control module 12. The engine control module 12 shown throughout the drawing is of conventional construction and is operative for controlling various engine function, including but not limited to engine ignition.

Prior to describing the construction and operation of the apparatus 10 of the present invention, a brief understanding of the cooperating conventional motor vehicle components is warranted. In this regard, the engine control module 12 is shown to be generally rectangular in shape and include an interface 14 for receiving a plurality of plug-in electrical connectors 16. The electrical connectors are normally vertically movable to and from engaged positions with the interface 14. Each of the electrical connectors 16 carries a wire harness 18 which extends in a generally horizontal direction.

In some conventional motor vehicles, the vehicle ignition key (not shown) is embedded with a chip required by the engine control module 12 to start the vehicle. The chip provides a measure of theft protection. However, sophisticate thieves have circumvented such theft protection through a removal of the engine control module and installation of a substitute module without such security limitations.

With continued reference to FIGS. 1–4, it will become apparent to those skilled in the art that the present invention provides an apparatus 10 for further preventing unauthorized use of a motor vehicle. More particularly, the present invention provides an apparatus 10 for preventing disconnection of the electrical connectors 16 of an engine control module 12. The apparatus 10 of the present invention is shown to generally include a shield 20 which is preferably constructed of 12 gauge stainless steel or high strength, low alloy (HSLA) steel as a minimum to resist attempt to cut or deform.

The shield includes a base 22 a top plate 24 and side wall 26 which interconnects the base 22 and the top plate 24. The base 22 is attached to an undersurface 30 of the engine control module 12 through a plurality of fasteners 32. The fasteners 32 pass through boss portions 34 normally provided in the engine control module for conventional mounting and through mounting flanges 36 provided in the base 22.

The top plate 24 of the shield 20 is oriented substantially parallel to the base 20 and extend immediately above the electrical connector 16. As such, the top plate 24 prevents withdrawal of the electrical connector 16 when the shield 20 is attached to the engine control module 12. In the exemplary embodiment illustrated, the top plate 24 is further interconnected to the base 20 through a generally C-shaped reinforcing strap 36. The reinforcing strap 36 is welded or otherwise suitably attached to the top plate 24 and the base 22.

In the preferred embodiment illustrated, the apparatus 10 of the present invention further includes a retaining bracket 40 which cooperates with the top plate 24 to define a plurality of channels 42 for receiving each of the wire harnesses 18. As shown throughout the drawings, the reinforcing bracket 40 includes a plurality of C-shaped segments 44. Adjacent ones of the C-shaped segments 44 are connected by mounting portions 46 which are secured to an underside of the top plate 24. In the exemplary embodiment, the reinforcing member 40 is attached to the top plate 24 through stainless steel rivets 50.

In the preferred embodiment, the shield 20 is further shown to include a plurality of ribs 52 for further strengthening. The ribs 52 are illustrated to extend across the top plate 24, across the side wall 26 and along a portion of the base 22. The ribs 52 cooperate to define the channels 42 for receiving the wire harnesses 18.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. In combination with a motor vehicle having an engine control module and a plurality of wire harnesses connected to the engine control module through a corresponding plurality of electrical connectors, an apparatus for preventing unauthorized removal of the engine control module comprising:

a generally C-shaped shield including a base plate, a top plate, and a side wall connecting said base plate and said top plate, said shield attached to the engine control module and extending immediately above the plurality of electrical connectors; and a retaining bracket attached to a bottom surface of said top plate, said retaining bracket and said top plate cooperating to define a plurality of channels for receiving the plurality of wire harnesses.

2. The apparatus of claim 1, wherein said retaining bracket is secured to said top plate with a plurality of rivets.

3. The apparatus for preventing unauthorized removal of an engine control module of claim 1, wherein said shield is unitarily constructed of steel.

4. The apparatus for preventing unauthorized removal of an engine control module of claim 1, wherein said retaining bracket is constructed of steel.

5. The apparatus for preventing unauthorized removal of an engine control module of claim 2, wherein said plurality of rivets are stainless steel rivets.

6. The apparatus of claim 1, wherein said plurality of electrical connectors are located between said top plate and said base.

7. The apparatus of claim 6, wherein said base is attached to an under side of the engine control module.

8. An arrangement for preventing unauthorized use of a motor vehicle, the arrangement comprising:

an engine control module for controlling engine ignition;

a plurality of wire harnesses removable attached to said engine control module through a corresponding plurality of electrical connectors, each of said electrical connectors being vertically movable relative to said engine control module to and from an engaged position; and a shield attached to said engine control module an operative for preventing vertical movement of said electrical connectors.

9. The arrangement for preventing unauthorized use of a motor vehicle of claim 8, wherein said shield includes a top plate vertically disposed above said plurality of electrical connectors.

10. The arrangement for preventing unauthorized use of a motor vehicle of claim 9, wherein said shield includes a base attached to an under side of said engine control module.

11. The arrangement for preventing unauthorized use of a motor vehicle of claim 10, wherein said shield further includes a side wall connecting said base and said top plate.

12. The arrangement for preventing unauthorized use of a motor vehicle of claim 11, wherein said shield further includes a C-shaped bracket interconnecting said top plate and said base.

13. The arrangement for prevention unauthorized use of a motor vehicle of claim 11, wherein said shield is unitarily constructed of steel.

14. The arrangement for prevention unauthorized use of a motor vehicle of claim 8, further comprising a retaining bracket attached to said top plate, said retaining bracket and said top plate cooperating to define a plurality of channels for receiving said plurality of wire harnesses.

15. An arrangement for preventing unauthorized use of a motor vehicle, the arrangement comprising:

an engine control module for controlling engine ignition;

a plurality of wire harnesses removable attached to said engine control module through a corresponding plurality of electrical connectors, each of said electrical connectors being vertically movable relative to said engine control module to and from an engaged position;

a shield attached to said engine control module operative for preventing a vertical movement of said electrical connectors; and a retaining bracket attached to said shield, said retaining bracket and said shield cooperating to define a plurality of channels for receiving said plurality of wire harnesses.

16. The arrangement for preventing unauthorized use of a motor vehicle of claim 15, wherein said shield includes a top plate vertically disposed above said plurality of electrical connectors.

17. The arrangement for preventing unauthorized use of a motor vehicle of claim 16, wherein said shield includes a base attached to an underside of said engine control module.

18. The arrangement for preventing unauthorized use of a motor vehicle of claim 17, wherein said shield further includes a side wall connecting said base and said top plate, said shield being unitarily constructed of steel.

19. The arrangement for preventing unauthorized use of a motor vehicle of claim 18, wherein said shield further includes a generally C-shaped bracket interconnecting said top plate and said base.

20. The arrangement for preventing unauthorized use of a motor vehicle of claim 15, wherein said retaining bracket includes a plurality of C-shaped segments, adjacent ones of said C-shaped segments interconnected by a mounting portion which is riveted to said shield.

* * * * *